US006278506B1

(12) United States Patent
Sumiyoshi et al.

(10) Patent No.: US 6,278,506 B1
(45) Date of Patent: *Aug. 21, 2001

(54) HOLOGRAPHIC POLYMER DISPERSED LIQUID CRYSTAL STRUCTURE HAVING AT LEAST TWO PHASE GRATINGS WHOSE REFLECTING SURFACES ARE NOT PARALLEL TO EACH OTHER, COLOR DISPLAY UNIT USING THE SAME AND PROCESS OF FABRICATING THEREOF

(75) Inventors: Ken Sumiyoshi; Hiroshi Hayama, both of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/767,870

(22) Filed: Dec. 17, 1996

(30) Foreign Application Priority Data

Dec. 21, 1995 (JP) .................................................. 7-332872

(51) Int. Cl.$^7$ ..................... G02E 1/1333; G02E 1/1335; G02F 1/1337

(52) U.S. Cl. ............................. 349/86; 349/92; 349/105; 349/93; 349/191

(58) Field of Search ................................. 349/86, 88, 89, 349/92, 105, 93, 191, 183, 188

(56) References Cited

U.S. PATENT DOCUMENTS 5,576,870 * 11/1996 Ohmae .................... 359/95

5,748,272 * 5/1998 Tanaka et al. .................... 349/86
5,751,452 * 5/1998 Tanaka et al. .................... 359/52
5,875,012 * 2/1999 Crawford et al. ................ 349/74

FOREIGN PATENT DOCUMENTS 4-355424   12/1992   (JP) .

OTHER PUBLICATIONS

Y. Miyama et al., "Direction of Field Indused Transition Between Different Twist States in STN", Proceedings of Lectures, 28a–A–1, p. 833.

K. Tanaka et al., "Holographically formed liquid–crystal/polymer device for reflective color display", *Journal of the SID*, vol. 2, No. 1, 1994, pp. 37–40.

K. Tanaka et al., "Optimization of Holographic PDLC for Reflective Color Display Applications", *SID 95 Digest*, 1995, pp. 267–270.

M. Date et al., "Three–Primary–Color Holographic Polymer Dispersed Liquid Crystal (HPDLC) Devices for Reflective Displays", *Asia Display '95*, 1995, pp. 603–606.

H. L. Ong, "New Normally White Negative Birefringence Film Compensated Twisted Nematic LCDs with Largest Viewing Angle Performance", *Japan Display '92*, 1992, pp. 247–250.

* cited by examiner

Primary Examiner—William L. Sikes
Assistant Examiner—Julie Ngo
(74) Attorney, Agent, or Firm—Sughrue, Mion, Zinn, Macpeak & Seas, PLLC

(57) ABSTRACT

A liquid crystal display has a holographic polymer dispersed liquid crystal between transparent substrates, and a plurality of phase gratings are formed in the holographic polymer dispersed liquid crystal so as to selectively reflect light components for the three primary colors.

18 Claims, 14 Drawing Sheets

Fig·10

HOLOGRAPHIC POLYMER DISPERSED LIQUID CRYSTAL STRUCTURE HAVING AT LEAST TWO PHASE GRATINGS WHOSE REFLECTING SURFACES ARE NOT PARALLEL TO EACH OTHER, COLOR DISPLAY UNIT USING THE SAME AND PROCESS OF FABRICATING THEREOF

FIELD OF THE INVENTION

This invention relates to a liquid crystal display structure and, more particularly, to a holographic polymer dispersed liquid crystal structure, a color display unit using the holographic polymer dispersed liquid crystal structure and a process of fabrication thereof.

DESCRIPTION OF THE RELATED ART

A reflective liquid crystal display unit is attractive because of a low power consumption, and research and development efforts have been made on the reflective liquid crystal display unit with emphasis on a color display unit. The reflective color liquid crystal display unit is largely broken down into a display unit with a polarizing plate and a display unit without a polarizing plate.

A typical example of the color liquid crystal display unit with a polarizing plate is disclosed by Y. Miyama et. al. in "Direction of Field Induced Transition Between Different Twist States in STN", Proceedings of Joint Lectures in 41th Applied Physics Meeting, page 833, 28a-A-1. However, the color variation is too narrow to satisfy user. Moreover, the polarizing plate does not allow the reflective color liquid crystal display unit to increase the reflectivity. Thus, the polarizing plate is causative of the undesirable results of the liquid crystal display unit.

On the other hand, a typical example of the reflective color liquid crystal display unit is disclosed by Keiji Tanaka et. al. in "Holographically formed liquid-crystal/polymer device for reflective color display", Journal of the Society for Information Display, vol. 2, pages 37 to 40, 1994. Polymer dispersed liquid crystal is disclosed in the paper. The holographic polymer dispersed liquid crystal is produced as follows.

First, photo-curable polymer is mixed with liquid crystal, and the mixture 1a is sealed between transparent plates 1b and 1c so as to form a liquid crystal cell 1 (see FIG. 1). The liquid crystal cell 1 is placed in a laser beam radiating system 2. The laser beam radiating system 2 includes a laser beam generator 2a, a beam splitter 2b and reflecting mirrors 2c, 2d and 2e. The laser beam generator 2a radiates a laser beam LB1 to a beam splitter 2b, and the beam splitter 2b splits the laser beam LB1 to laser sub-beams LB2 and LB3. The reflecting mirror 2c reflects the laser sub-beam LB2 toward the liquid crystal cell 1, and the reflecting mirrors 2d and 2e reflect the laser sub-beam LB3 toward the liquid crystal cell 1. The laser sub-beam LB2 is incident onto one of the transparent plates 1b/1c, and the other laser sub-beam LB3 is incident onto the other of the transparent plate 1b/1c. A phase difference takes place between the incident laser sub-beams LB2 and LB3.

The laser sub-beam LB2 interferes with the laser sub-beam LB3, and, accordingly, the laser sub-beams LB2 and LB3 generate interference fringes in the mixture 1a. The interference fringes are repeated in a direction of the thickness of the liquid crystal cell 1, and form strongly illuminated layers and weakly illuminated layers alternated with one another in the mixture 1a. The distance between the strongly illuminated layer and the weakly illuminated layer is dependent on the wavelength of the laser sub-beams LB2/LB3.

The photo-curable polymer in the strongly illuminated layers is polymerized, and the strongly illuminated layers are formed into polymer layers. On the other hand, liquid crystal droplets are formed in the weakly illuminated layers. As a result, the mixture 1a is formed into a multilayer structure consisting of the polymer layers 1d and the liquid crystal droplet layers 1e as shown in FIG. 2. The prior art fabrication process is also disclosed in Japanese Patent Publication of Unexamined Application No. 4-355424.

Thus, the holographic polymer dispersed liquid crystal between the transparent plates 1b/1c has the multilayer structure. The polymer layers 1d are different in refractive index from the liquid crystal droplet layers 1e, and, for this reason, the holographic polymer dispersed liquid crystal structure is considered to be a diffraction grating in which the refractive index is spatially changed.

Assuming now that light LB4 is obliquely incident into the holographic polymer dispersed liquid crystal, the multilayer structure of the holographic polymer dispersed liquid crystal reflects the incident light LB4, and the reflecting direction is determined from the angle A1 of the multilayer structure to the transparent plates 1b/1c and the direction of the incident light LB4.

The incident light LB4 is reflected on the liquid crystal droplet layers 1e as shown in FIG. 2, and reflected light LB5 from one of the liquid crystal droplet layer 1e interferes with reflected light LB6 from another liquid crystal droplet layer 1e. When reflected light is equal in phase to another light, the in-phase lights interfere with one another so as to increase the intensity. Thus, the multilayer structure strongly reflects the light having the wavelength determined from the periodicity of the multilayer structure and the spacious variation of refractive index. The multilayer structure provides virtual reflecting surfaces in the liquid crystal cell, and reflects the light of a specific wavelength.

When an appropriate electric potential is applied to the holographic polymer dispersed liquid crystal, the liquid crystal droplet layers 1e change the orientation of the liquid crystal, and break the interference conditions for the reflection. Thus, the reflection intensity of the holographic polymer dispersed liquid crystal is controlled by changing the electric potential applied thereto, and the holographic polymer dispersed liquid crystal is available for the liquid crystal display unit. No polarizing plate is incorporated in the holographic polymer dispersed liquid crystal display unit.

When a holographic polymer dispersed liquid crystal layer for reflecting red light, a holographic polymer dispersed liquid crystal layer for reflecting green light and a holographic polymer dispersed liquid crystal layer for reflecting blue light are laminated, the three-layer holographic polymer dispersed liquid crystal structure is available for a full-color liquid crystal display unit. When image signals independently control the holographic polymer dispersed liquid crystal layers, a color image is formed on the full-color liquid crystal display unit.

However, the prior art holographic polymer dispersed liquid crystal display unit encounters the following problems.

First, it is impossible for the prior art holographic polymer dispersed liquid crystal display unit to achieve a large refractive index. This is because of the fact that the multilayer structure merely reflects the light of a specific wavelength incident thereinto within a specific directional range.

Second, when the holographic polymer dispersed liquid crystal layers for primary three colors are laminated for a full-color liquid crystal display unit, each of the holographic polymer dispersed liquid crystal layers requires a pair of glass substrates, and six glass substrates are incorporated in the full-color liquid crystal display unit. This results in a heavy bulky liquid crystal display unit.

Third, the holographic polymer dispersed liquid crystal layers for the primary three color require three thin film transistor arrays formed on the respective substrates, because the three holographic polymer dispersed liquid crystal layers are independently controlled for a full-color image. The thin-film transistor array is so expensive that the manufacturer hardly decreases the production cost the full-color liquid crystal display unit.

Fourth, the prior art process for the full-color liquid crystal display unit requires a delicate fabrication process. It is necessary for the manufacturer to laminate the holographic polymer dispersed liquid crystal layers in such a manner that the pixels of one liquid crystal layer are precisely aligned with the pixels of other two liquid crystal layers. The precise alignment work lowers the productivity, and, accordingly, the production cost is increased.

SUMMARY OF THE INVENTION

It is therefore an important object of the present invention to provide a liquid crystal structure which produces a highly bright image.

It is another important object of the present invention to provide a color liquid crystal display unit which is light and inexpensive.

It is yet another object of the present invention to provide a simple fabricating process for reducing the production cost.

To accomplish the object, the present invention proposes to form a plurality of phase gratings different in orientation from one another in a holographic polymer dispersed liquid crystal layer.

In accordance with one aspect of the present invention, there is provided a liquid crystal structure formed between plate members comprising a plurality of phase gratings spatially modifying a refractive index and differently oriented with respect to the plate members for reflecting rays through one of the plate members to the outside thereof.

In accordance with another aspect of the present invention, there is provided a liquid crystal display for producing an image on a screen thereof, comprising: a first substrate and a second substrate spaced from one another for forming a space therebetween; an image producing medium filling the space, and having a plurality of phase gratings differently oriented with respect to the first and second substrates and responsive to an electric field for changing reflecting directions of rays respectively incident onto the plurality of phase gratings; a plurality of electrodes formed in the space for selectively creating the electric field; a light source for illuminating the image producing medium; and a controlling circuit connected to the plurality of electrodes, and selectively supplying an electric potential between at least two of the plurality of electrodes for creating the electric field across the image producing medium, thereby causing the plurality of phase gratings to selectively reflect the incident rays to the outside of the liquid crystal display for forming the image.

In accordance with yet another aspect of the present invention, there is provided a process of fabricating a liquid crystal structure, comprising the steps of: a) preparing a mixture of photo-curable polymer and a liquid crystal sealed between a first substrate and a second substrate; b) radiating a first laser beam through a first substrate to the mixture and a second laser beam through a second substrate to the mixture so as to produce first interference fringes in the mixture, thereby forming a first phase grating in the mixture; c) changing an incident direction of at least one of the first laser beam and the second laser beam so as to produce second interference fringes different in orientation with respect to the first and second substrates from the first interference fringes, thereby forming a second phase grating in the mixture; and d) repeating the step c), if necessary.

BRIEF DESCRIPTION OF THE DRAWINGS

The features and advantages of the holographic polymer dispersed liquid crystal structure, the color display unit and the fabrication process according to the present invention will be more clearly understood from the following description taken in conjunction with the accompanying drawings in which.

DESCRIPTION OF THE PREFERRED EMBODIMENTS

First Embodiment

Figure 1:
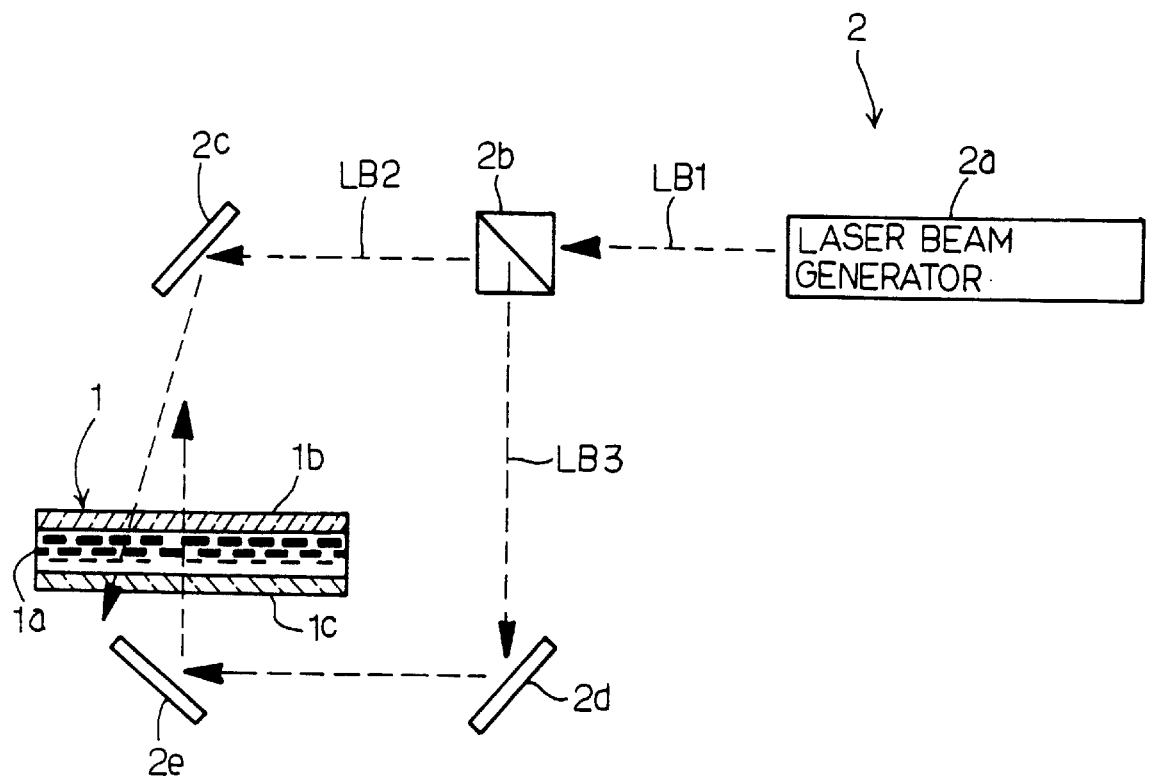
FIG. 1 is a schematic view showing the two-way radiation of laser beam light for producing the multilayer structure of the holographic polymer dispersed liquid crystal in the prior art process.
Figure 2:
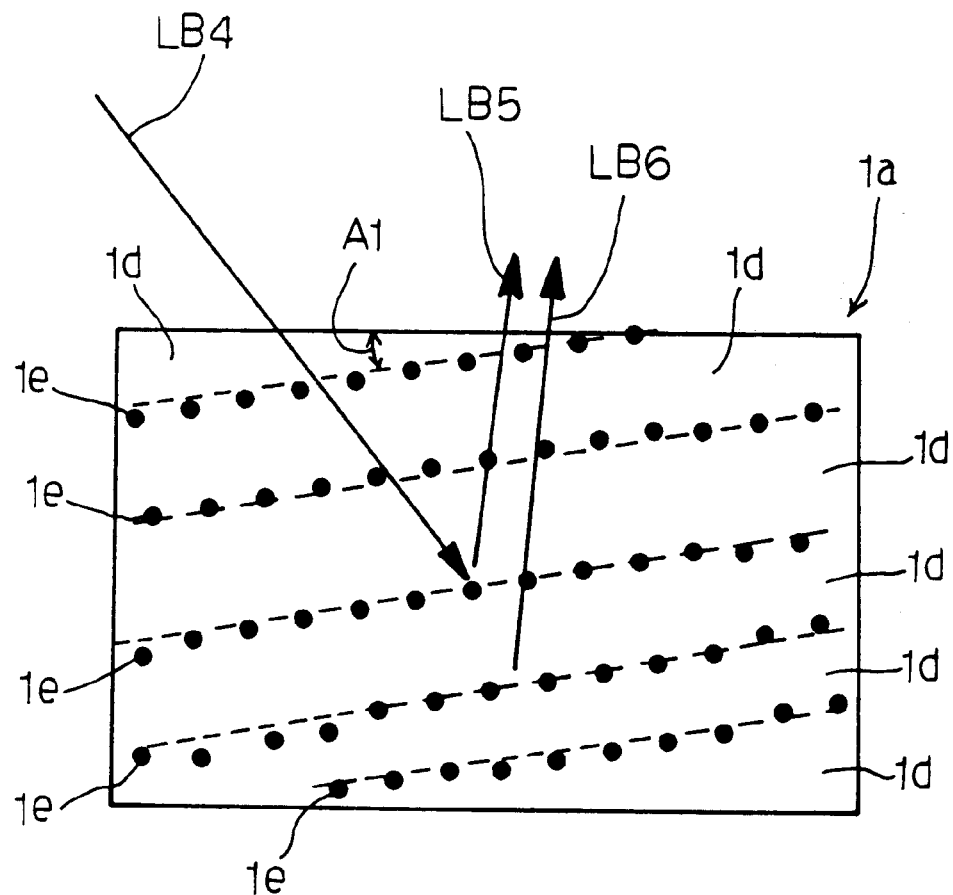
FIG. 2 is a schematic cross sectional view showing the structure of the prior art holographic polymer dispersed liquid crystal.
Figure 3:
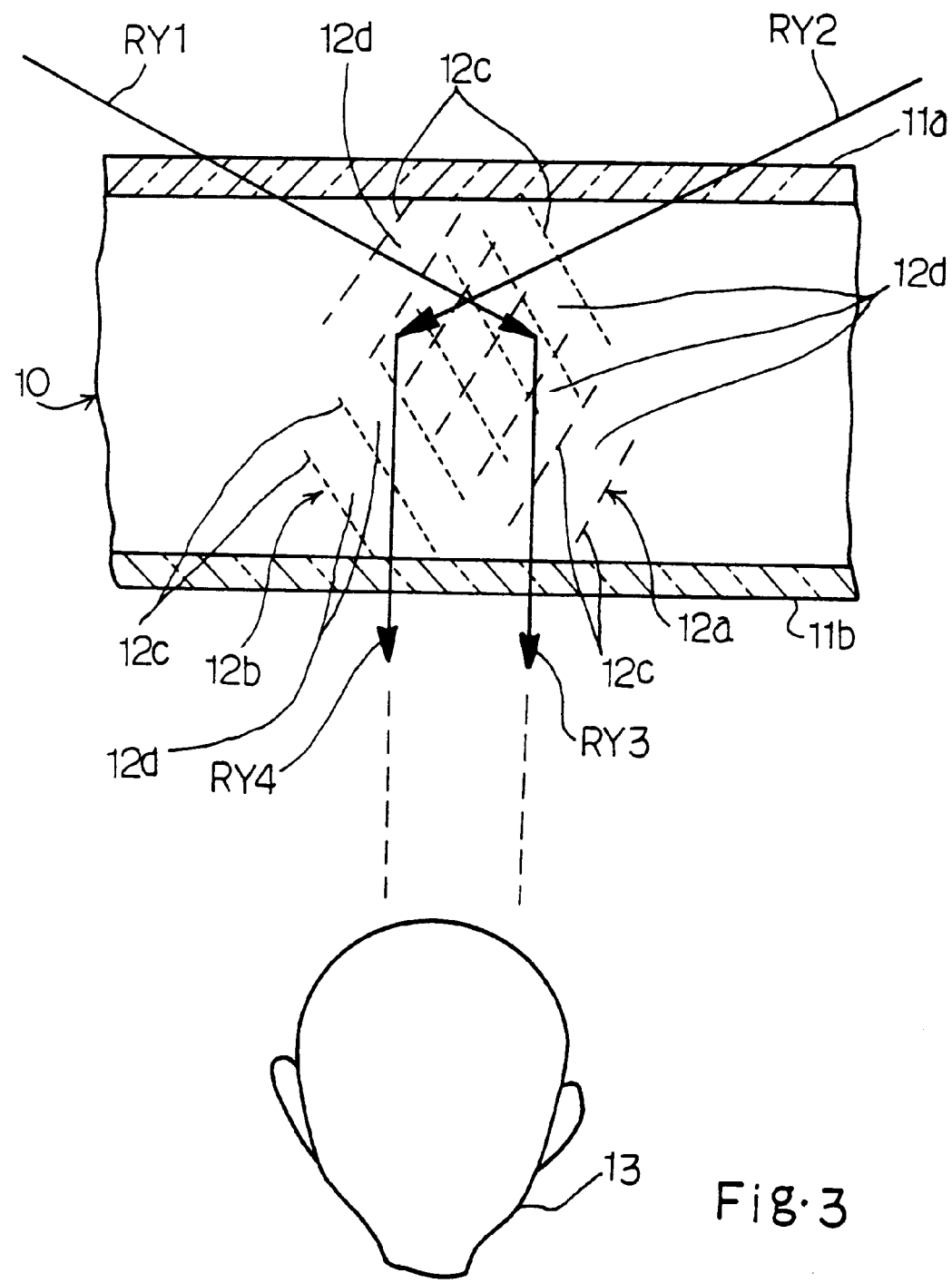
FIG. 3 is a cross sectional view showing a holographic polymer dispersed liquid crystal structure according to the present invention.

Referring to FIG. 3 of the drawings, an image producing medium 10 is sealed between transparent plates 11a and 11b, and is formed of holographic polymer dispersed liquid crystal. A plurality of phase gratings 12a and 12b are incorporated in the image producing medium 10, and are formed of liquid crystal droplet layers 12c alternated with polymer layers 12d. The plurality of phase gratings 12a and 12b are arranged in such a manner as to have identical interference light components. Term "interference light" means the strongest light component reflected on the phase grating, and the wavelength of the interference light is determined from the periodicity of the phase grating and the dispersion of refractive index.

The phase gratings 12a and 12b are represented by broken lines and dot lines, respectively, and are differently oriented in the image producing medium 10. In this instance, only two phase gratings 12a/12b are shown in FIG. 3. More than two phase gratings may be formed in the image producing medium 10.

The phase gratings 12a/12b spatially modify the refractive indexes, respectively, and increases the amount of transmitting light. In detail, assuming now that light of a specific wavelength is incident onto the transparent plate 11a, a ray of light RY1 obliquely proceeds through the image producing medium 10, and another ray of light RY2 proceeds through the image producing medium 10. The ray of light RY1 is reflected on the phase grating 12b, and the reflected ray RY3 reaches an observer 13. On the other hand, the ray of light RY2 is reflected on the other phase grating 12b, and the reflected ray RY4 reaches the observer 13. If only one phase grating is formed in the image producing medium 10, either ray RY1 or RY2 is observed, and the other ray RY2 or RY1 is never transmitted through the image producing medium 10. However, the plurality of phase gratings 12a/12b reflect the rays RY1/RY2 incident at different angles, and increases the amount of light to be transmitted. Moreover, the plurality of phase gratings removes the limit of illuminating direction.

Figure 4:
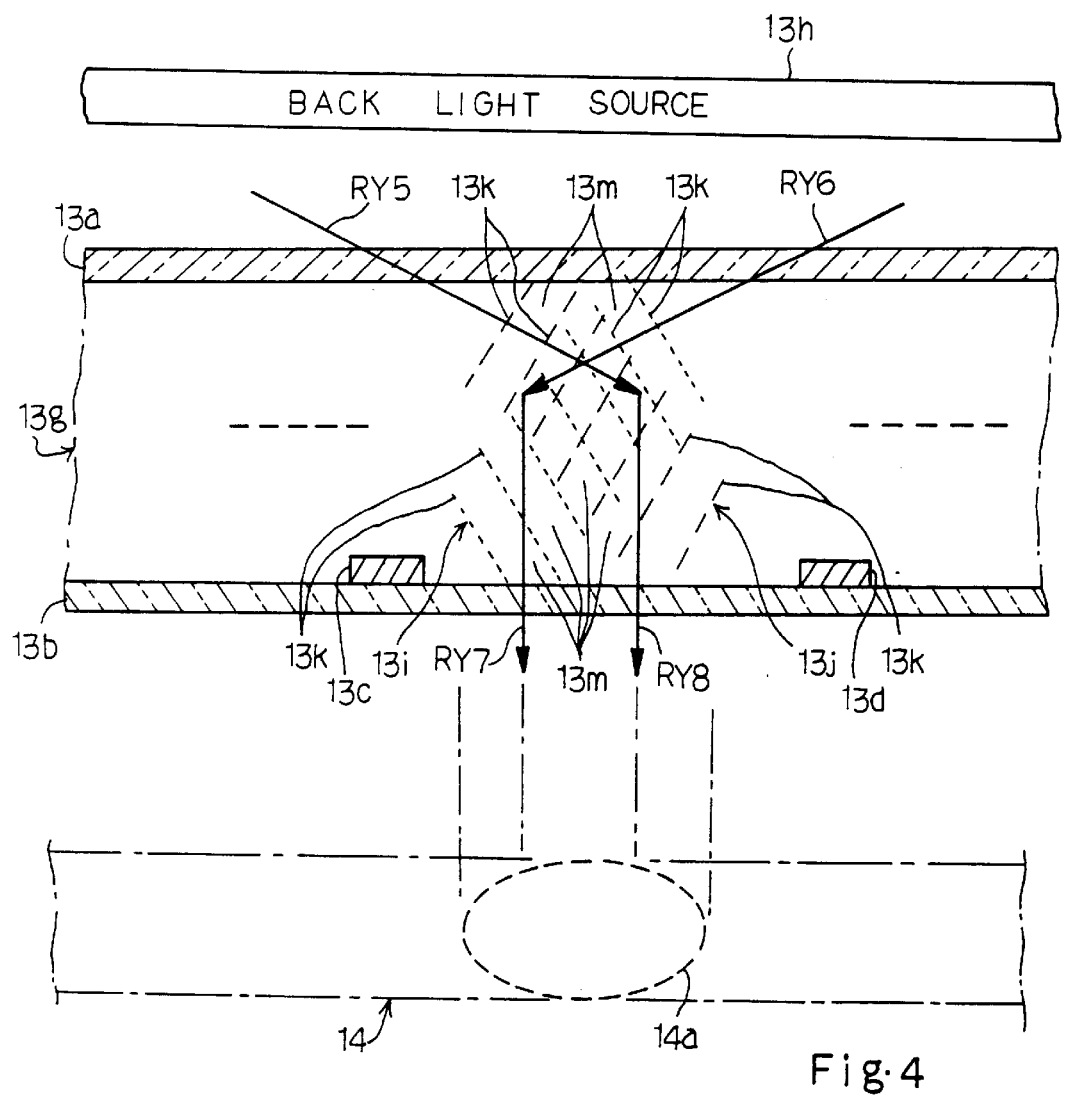
FIG. 4 is a cross sectional view showing a transmission type liquid crystal display unit according to the present invention.

The liquid crystal structure shown in FIG. 3 is available for a transmission type liquid crystal display unit. FIG. 4 illustrates the basic structure of the transmission type liquid crystal display unit according to the present invention.

The transmission type liquid crystal display unit comprises a transparent glass substrate 13a, another transparent glass substrate 13b spaced from the transparent glass substrate 13a by spacers (not shown), a transparent common electrode 13c formed on the inner surface of the transparent glass substrate 13b, a plurality of transparent pixel electrodes 13d also formed on the inner surface of the transparent glass substrate 13b, an image producing medium 13g filling the space between the transparent glass substrates 13a and 13b and a back light source 13h illuminating the image producing medium 13g through the transparent glass substrate 13a. Though not shown in FIG. 4, a controlling circuit is connected to the transparent pixel electrodes 13d, 13e, 13f, . . . so as to sequentially supply an image signal thereto. The image producing medium 13g is formed of holographic polymer dispersed liquid crystal, and a plurality of phase gratings 13i and 13j are formed in the image producing medium 13g. Although only two phase gratings 13i and 13j are shown in FIG. 4, the phase gratings are not limited to two. The phase gratings 13i and 13j are implemented liquid crystal droplet layers 13k alternated with polymer layers 13m.

In operation, the back light source 13h illuminates the image producing medium 13g through the transparent glass substrate 13a. If the controlling circuit (not shown) supplies the image signal to the transparent pixel electrode 13d at a certain timing, an electric field is created between the transparent pixel electrode 13d and the transparent common electrode 13c, and the liquid crystal droplet layers 13k changes the orientation of the liquid crystal. As a result, the rays of back light RY5 and RY6 pass through the liquid crystal droplet layers 13k, and are reflected on the phase gratings 13i and 13j. The reflected rays RY7 and RY8 are transmitted through the transparent glass substrate 13b, and form a part 14a of an image 14.

Figure 5A:
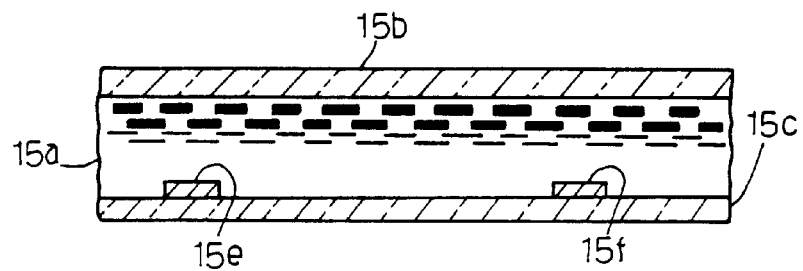
FIGS. 5A to 5C are schematic views showing a process of fabricating the holographic polymer dispersed liquid crystal structure shown in FIG. 3.

The liquid crystal structure shown in FIG. 4 is fabricated as follows. First, mixture 15a of liquid crystal and photo-curable polymer is sealed between the transparent substrates 15b and 15c as shown in FIG. 5A. Electrodes 15e, 15e', 15f and 15f' are formed on the transparent substrates 15b and 15c.

Figure 5B:
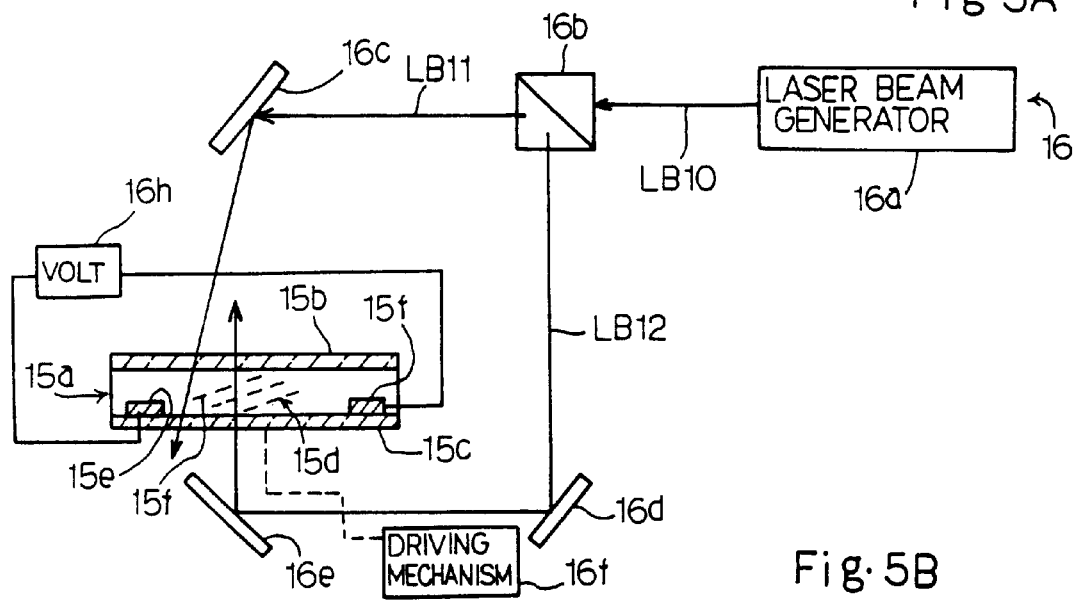

The mixture 15a sealed between the transparent substrates 15b/15c is placed in an interference fringe generator 16 (see FIG. 5B). The interference fringe generator 16 includes a laser beam generator 16a, a beam splitter 16b, reflecting mirrors 16c to 16e and a driving mechanism 16f connected to a table for rotating the liquid crystal structure. The driving mechanism 16f rotates the liquid crystal structure for producing a phase grating 15d, and a voltage source 16h applies a potential between the electrodes 15e and 15f. The laser beam generator 16a radiates a laser beam LB10 of a specific wavelength to the beam splitter 16b, and the beam splitter 16b branches the laser beam LB10 to laser sub-beams LB11 and LB12. The laser sub-beam LB11 is reflected on the reflecting mirror 16c, and is incident onto the mixture 15a, and the other laser sub-beam LB11 is reflected on the reflecting mirrors 16d and 16e, and is incident on the mixture 15a. The laser sub-beams LB11 and LB12 cause interference fringes to take place in the mixture 15a, and the interference fringes form the phase grating 15d through the photo-polymerization of the photo-curable polymer as shown in FIG. 5B.

Figure 5C:
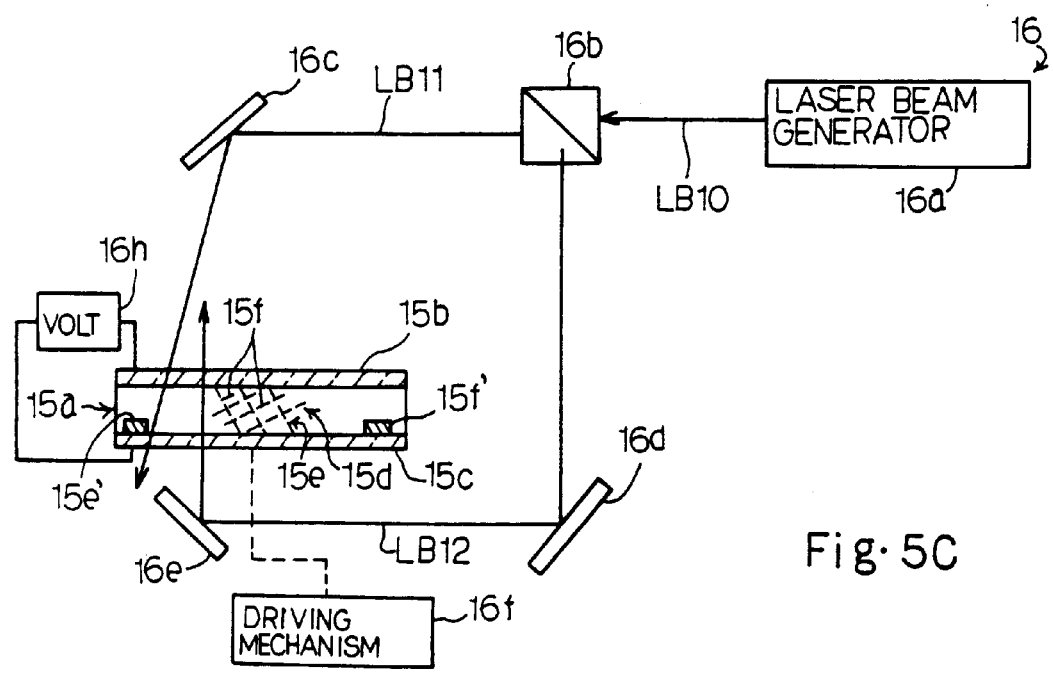

The driving mechanism 16f rotates the liquid crystal structure at 90 degrees so as to place it at another appropriate position for producing another phase grating 15e, and the voltage source 16h applies the potential between the electrodes 15e' and 15f'. The laser beam generator 16a radiates the laser beam LB10 to the beam splitter 16b, and the splitter 16b supplies the laser sub-beams LB11 and LB12 through the reflecting mirrors 16c and 16d/16e to the mixture 15a. The laser sub-beams LB11/LB12 are incident onto the mixture 15a at different angles. Interference fringes take place in the mixture, and produce another phase grating 15e as shown in FIG. 5C. The phase gratings 15d and 15e are implemented by liquid crystal droplet layers 15f alternated with polymer layers.

Thus, the laser beam LB10 is repeatedly radiated at different angles, and a plurality of phase gratings 15d, 15e, ... are produced in the mixture in such a manner as to be alternated with liquid crystal droplet layers 15f. If a transparent common electrode and transparent pixel electrodes are formed on the inner surfaces of the transparent substrate 15c, the transmission type liquid crystal display unit is fabricated through the process described hereinbefore.

Figure 6:
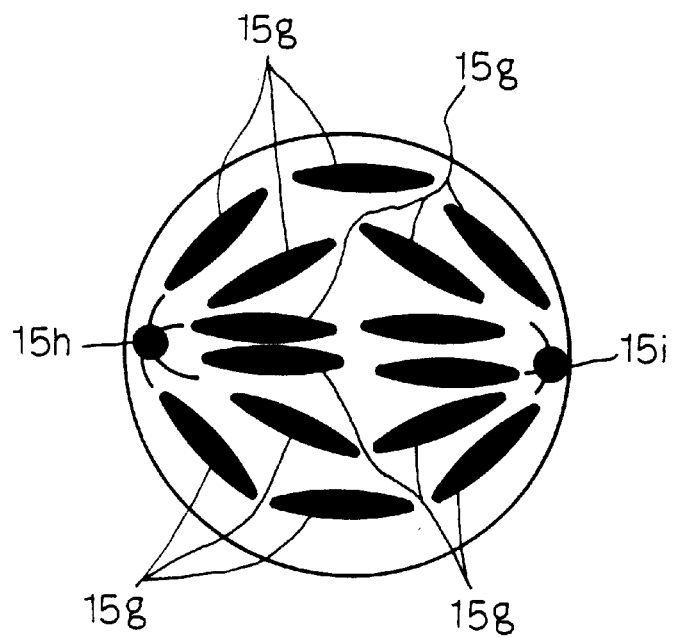
FIG. 6 is a view showing the molecules of liquid crystal.

The liquid crystal droplet consists of molecules 15g oriented between two poles 15h and 15i as shown in FIG. 6. In the following description, term "orientation of liquid crystal droplets" means the direction of the molecules 15g between the poles 15h and 15i.

Figure 8:
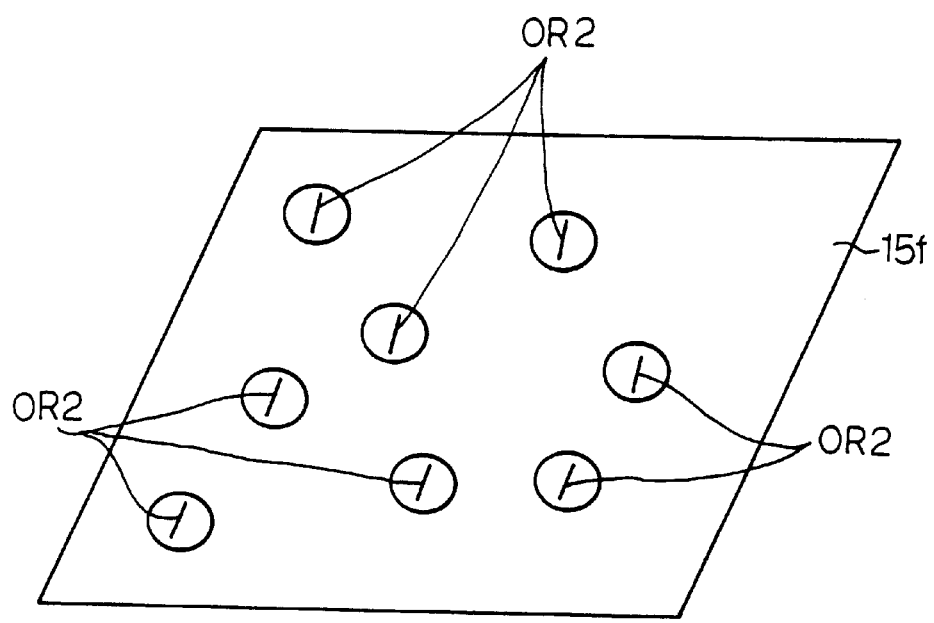
FIG. 8 is a view showing a uniform orientation of liquid crystal droplets in the liquid crystal droplet layers of the holographic polymer dispersed liquid crystal structure according to the present invention; FIG.
Figure 7:
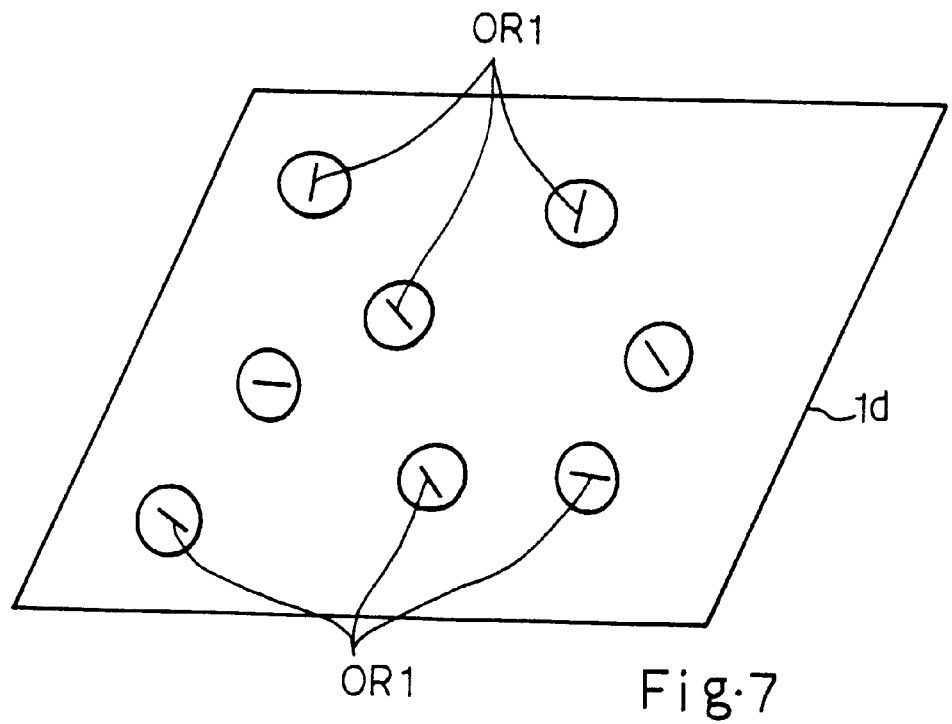
FIG. 7 is a view showing a random orientation of liquid crystal droplets in the liquid crystal droplet layers of the prior art holographic polymer dispersed liquid crystal structure.

The orientation OR1 of liquid crystal droplets is random in the liquid crystal droplet layer of the prior art holographic polymer dispersed liquid crystal as shown in FIG. 7. On the other hand, the orientation OR2 of liquid crystal droplets in the layers 15f is substantially uniform as shown in FIG. 8.

The uniform orientation OR2 is achieved by applying the potential across the mixture 15a during the laser radiation. Alternatively, if the laser sub-beams LB11/LB12 are directly polarized for slowly polymerizing the photo-curable polymer, the photo-polymerization takes place only in the photo-curable polymer absorbing the laser light in the direct polarizing direction, and the polymer layer has anisotropy determined from the direct polarizing direction. The liquid crystal droplet layers in contact with the polymer layer also has the anisotropy, and the liquid crystal droplets have the uniform orientation OR2.

The liquid crystal droplet layers 15f thus uniformly oriented differently behave depending upon the direction of electric field applied thereacross. When the electric field is applied across the liquid crystal droplet layer 15f in the direction parallel to the orientation OR2 of liquid crystal droplets or the direction between the poles 15h and 15i, the liquid crystal droplets do not change the orientation. On the other hand, when the electric field is applied across the liquid crystal droplet layer 15f in perpendicular to the orientation OR2 of liquid crystal droplets, the liquid crystal droplets change the orientation at a threshold level.

It is possible to produce a plurality of multilayer structure each having the polymer layers and the uniformly oriented liquid crystal droplet layers in the image producing medium. As will be described hereinlater, the plurality of multilayer structures may be different in not only the orientation of liquid crystal droplets but also the wavelength of interference light from one another.

Figure 9:
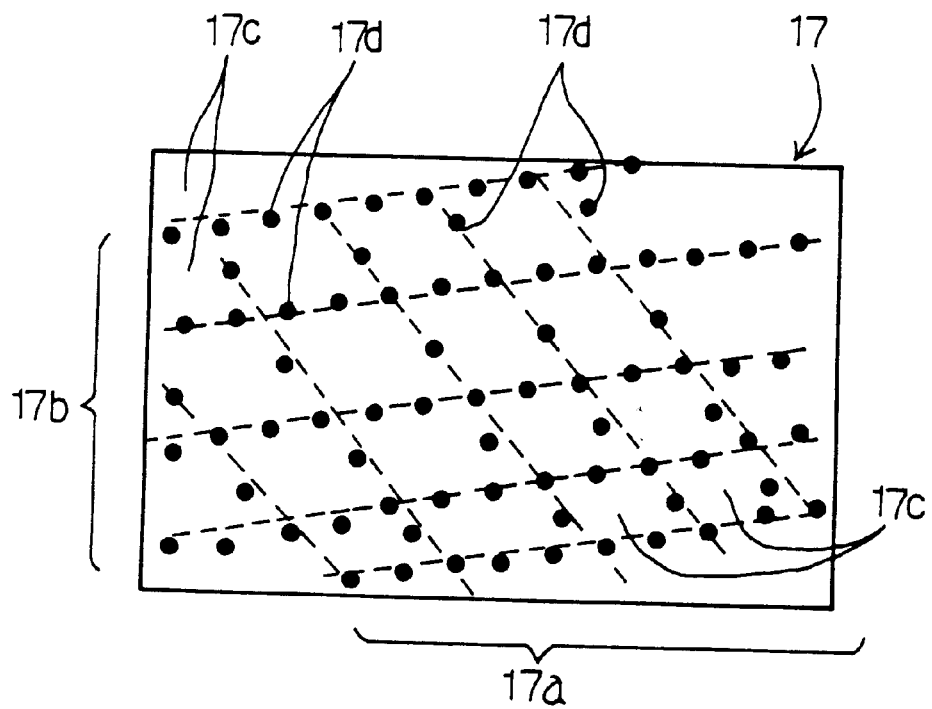
FIG. 9 is a view showing a multilayer structure formed in a holographic polymer dispersed liquid crystal structure according to the present invention.

FIG. 9 illustrates a holographic polymer dispersed liquid crystal structure 17 where two multilayer structures 17a and 17b are incorporated. The multilayer structures 17a and 17b are formed by polymer layers 17c and liquid crystal droplet layers 17d alternated with one another.

As will be appreciated from the foregoing description, the holographic polymer dispersed liquid crystal structure according to the present invention increases the intensity of transmission light by virtue of the plurality of phase gratings.

Second Embodiment

Figure 10:
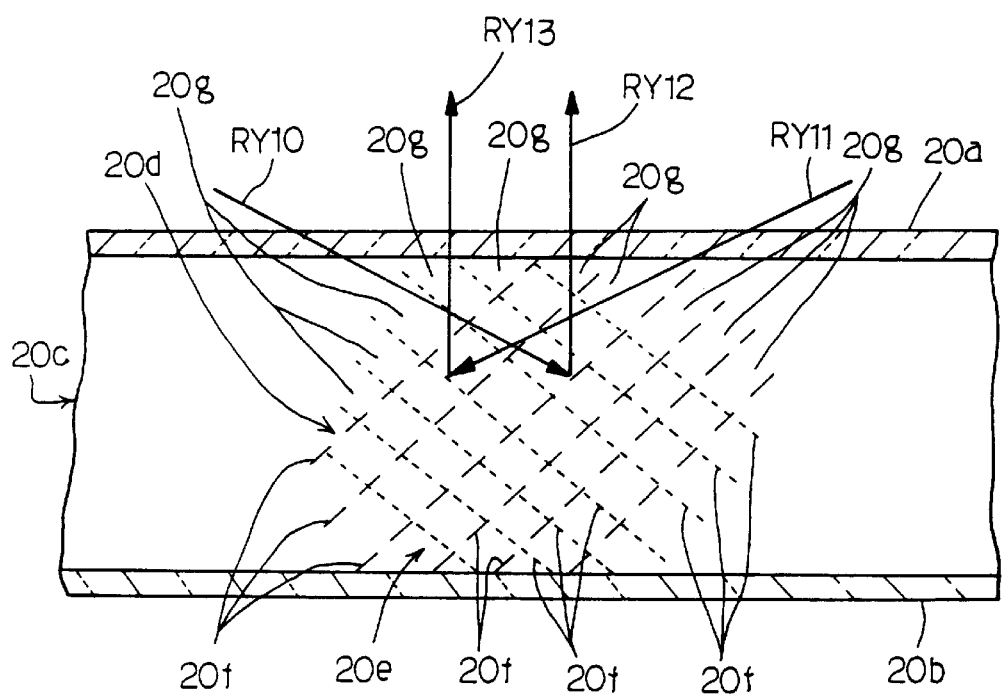
FIG. 10 is a cross sectional view showing another holographic polymer dispersed liquid crystal structure according to the present invention.

Turning to FIG. 10 of the drawings, another holographic polymer dispersed liquid crystal structure embodying the present invention comprises transparent glass substrates 20a and 20b spaced from each other and holographic polymer dispersed liquid crystal 20c filling the gap between the transparent glass substrates 20a and 20b. The holographic polymer dispersed liquid crystal 20c has two phase gratings 20d and 20e differently oriented from one another. The orientations of the phase gratings 20d and 20e are different from those of the phase gratings 12a and 12b of the first embodiment, and, for this reason, the holographic polymer dispersed liquid crystal structure reflects incident rays RY10 and RY11 to through the transparent substrate 20a.

The phase gratings 20d and 20e has a multilayer structure of liquid crystal droplet layers 20f and polymer layers 20g alternated with one another. The rays RY10/RY11 of light of a specific wavelength are incident through the transparent substrate 20a onto the holographic polymer dispersed liquid crystal 20c at different angles, and are respectively reflected on the phase gratings 20d and 20e. The reflected rays RY12 and RY13 pass through the transparent substrate 20a. Thus, the reflected rays RY12/RY13 return to the same side as the incident rays RY10/RY11, and increases the intensity of reflected light.

Figure 11:
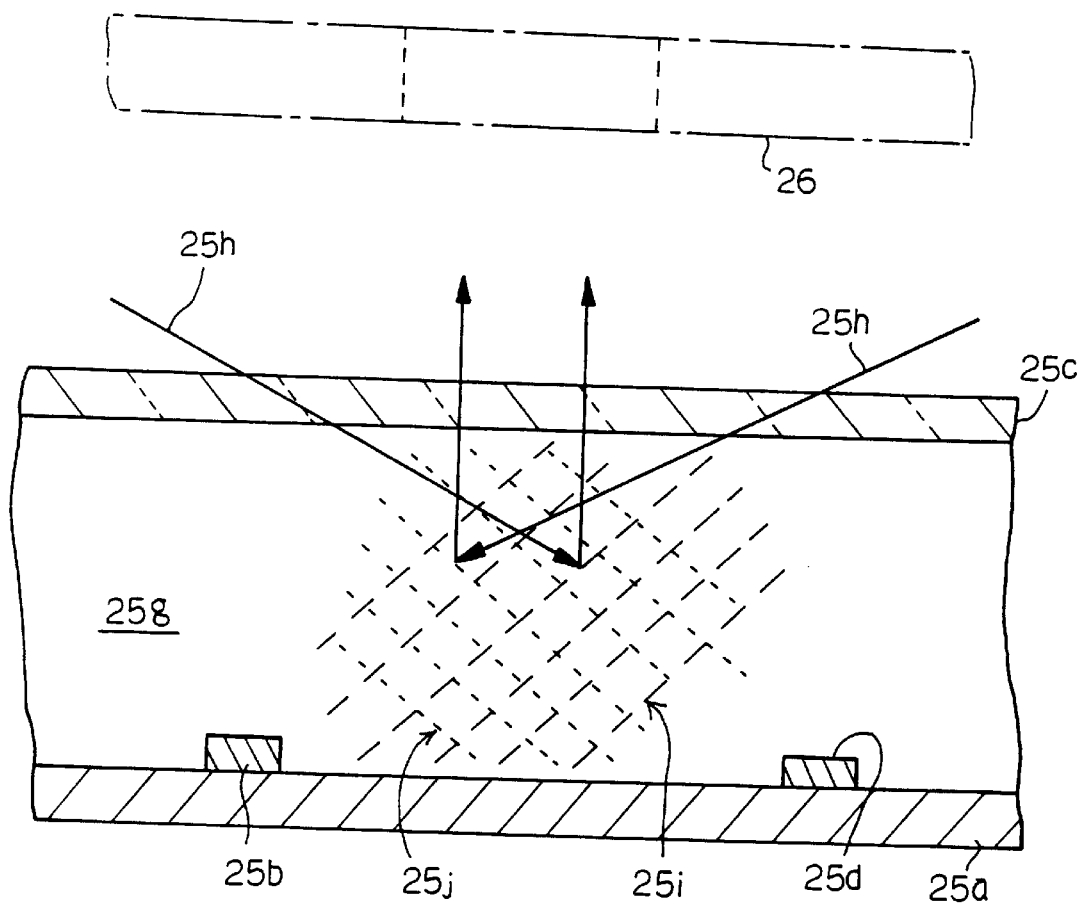
FIG. 11 is a cross sectional view showing a reflective liquid crystal display unit according to the present invention.

The holographic polymer dispersed liquid crystal structure shown in FIG. 10 is available for a reflective liquid crystal display unit as shown in FIG. 11.

The reflective liquid crystal display unit comprises a substrate 25a, a common electrode 25b formed on the inner surface of the substrate 25a, a transparent substrate 25c spaced from the substrate 25a by spacers (not shown), pixel electrodes 25d formed on the inner surface of the transparent substrate 25a and an image producing medium 25g filling the gap between the substrates 25c and 25a. The image producing medium is illuminated by room light 25h. The image producing medium 25g is formed of holographic polymer dispersed liquid crystal, and a plurality of phase gratings 25i and 25j are formed in the image producing medium 25g.

Though not shown in FIG. 11, a controlling circuit is connected to the pixel electrodes 25d, and supplies an image signal thereto for producing an image 26 on the same side as the incident light 25h. The behavior of the image producing medium 25g is analogous to that of the first embodiment, and description is not repeated for the sake of simplicity.

Third Embodiment

A holographic polymer dispersed liquid crystal structure embodying the present invention has a plurality of phase gratings for reflecting different interference light components. The different interference light components impart a color to an image. If three phase gratings reflect the interference light components corresponding to red, green and blue, the liquid crystal display can form a white image from these interference light components.

Figure 12:
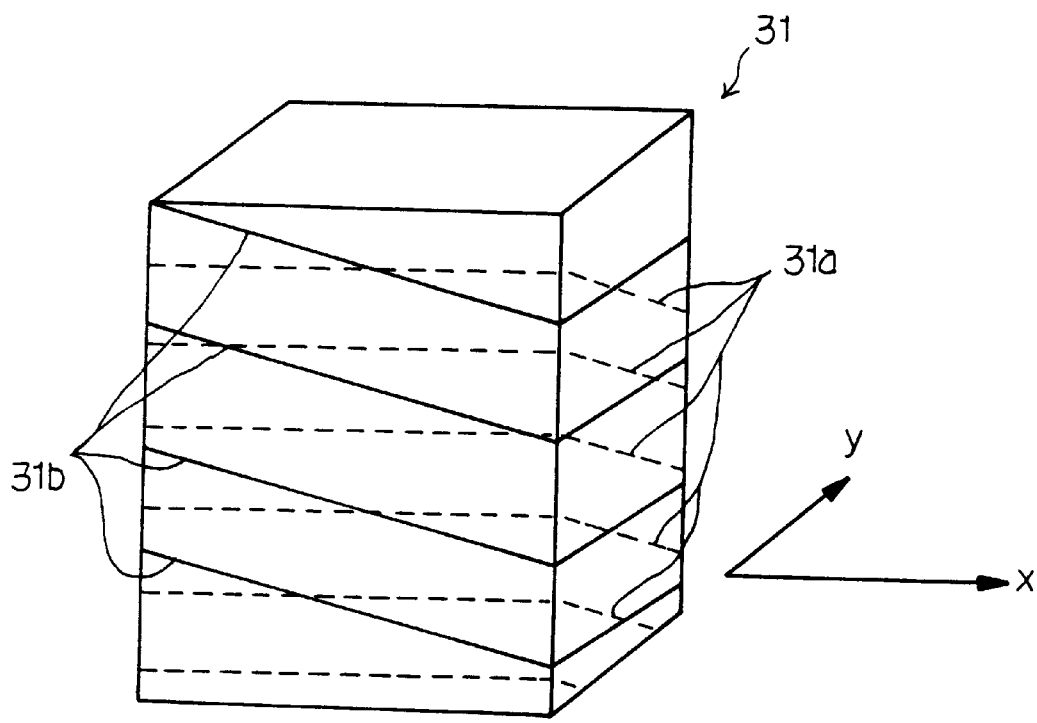
FIG. 12 is a perspective view showing a composite multilayer structure for different interference light components.
Figure 13:
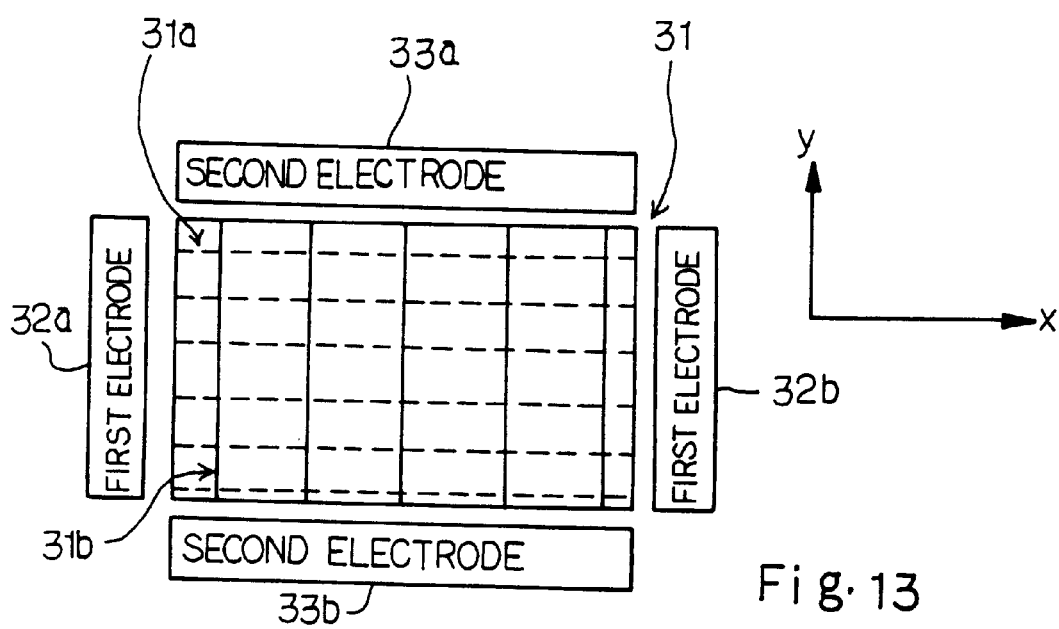
FIG. 13 is a plan view showing a layout of a liquid crystal display unit using the composite multilayer structure for independently controlling different interference light components.

FIG. 12 illustrates a composite multilayer structure 31 available for a color liquid crystal display unit. A plurality of multilayer structures 31a and 31b are incorporated in the composite multilayer structure 31, and are oriented in y-direction and x-direction. Although the multilayer structures 31a/31b individually have optical anisotropy, the composite multilayer structure is optically isotropic, because the multilayer structures 31a and 31b are differently oriented.

Two pairs of electrodes 32a/32b and 33a/33b are respectively provided for the multilayer structures 31a and 31b. The electrodes 32a/32b of the first pair are used for controlling the multilayer structure 31a, and create an electric field perpendicular to the orientation of liquid crystal droplets of the multilayer structure 31a. However, the direction of electric field is aligned with the orientation of liquid crystal droplets of the other multilayer structure 31b. For this reason, when an appropriate potential is applied between the electrodes 32a and 32b, the liquid crystal droplet layers change the orientation so as to modify the optical property of the multilayer structure 31a, and the electrodes 32a and 32b do not have any influence on the optical property of the other multilayer structure 31b.

Similarly, the electrodes 33a/33b of the second pair are used for controlling the multilayer structure 31b, and create an electric field perpendicular to the orientation of liquid crystal droplets of the multilayer structure 31b. However, the direction of electric field is aligned with the orientation of liquid crystal droplets of the other multilayer structure 31a. For this reason, when an appropriate potential is applied between the electrodes 33a and 33b, the liquid crystal droplet layers change the orientation so as to modify the optical property of the multilayer structure 31b, and the electrodes 33a and 33b do not have any influence on the optical property of the other multilayer structure 31a. Thus, the anisotropy of the liquid crystal droplet layers between the multilayer structures 31a and 31b allows the liquid crystal display unit to independently control the optical properties of the multilayer structures.

Figure 14:
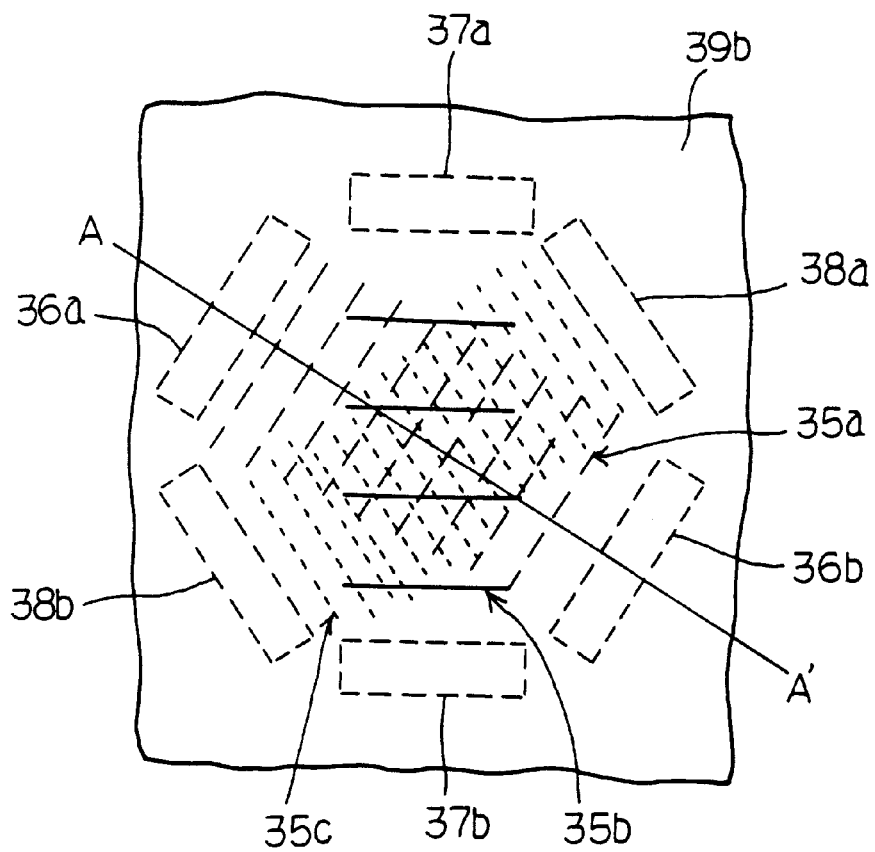
FIG. 14 is a plan view showing a layout of a color liquid crystal display unit according to the present invention.
Figure 15:
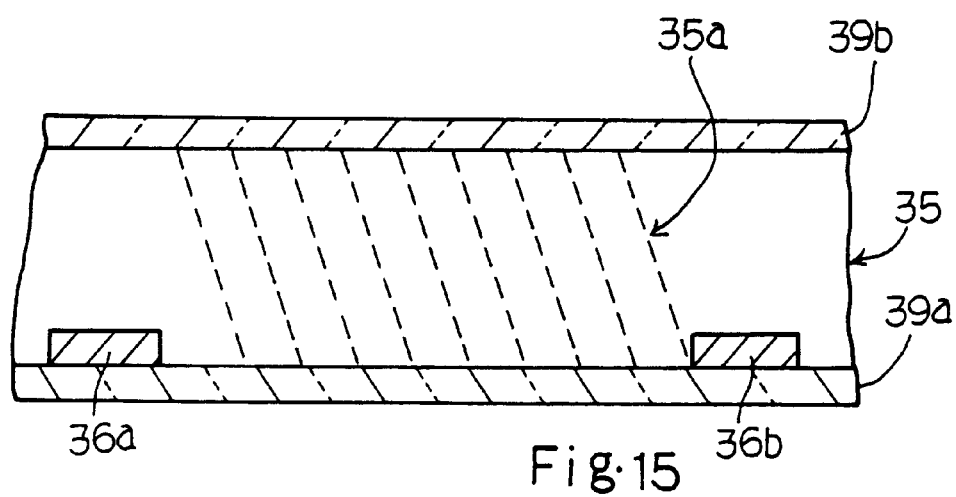
FIG. 15 is a cross sectional view taken along line A–A' of FIG. 14 and showing the structure of the color liquid crystal display unit.

A color liquid crystal display unit requires three multilayer structures, and FIGS. 14 and 15 illustrates a composite multilayer structure having three multilayer structures 35a, 35b and 35c differently oriented in an image producing medium 35. The image producing medium 35 is formed of holographic polymer dispersed liquid crystal. The three multilayer structures 35a, 35b and 35c have the interference light components corresponding to the primary three colors, i.e., red, green and blue, and three pairs of electrodes 36a/36b, 37a/37b and 38a/38b independently control the orientations of liquid crystal droplets in the three multilayer structures 35a, 35b and 35c. The image producing medium 35 fills the gap between transparent substrates 39a and 39b, and the electrodes 36a/36b, 37a/37b and 38a/38b are arranged on the inner surface of the transparent substrate 39a.

Though not shown in FIGS. 14 and 15, a controlling circuit is connected to the three pairs of electrodes 36a/36b, 37a/37b and 38a/38b, and selectively supplies three primary color signals to the electrodes 36a/36b, 37a/37b and 38a/38b for producing a full-color image.

When an appropriate potential is applied between the electrodes 36a and 36b, the liquid crystal droplets in the multilayer structure 35a changes the orientation, and, accordingly, modifies the optical properties. However, the other multilayer structures 35b and 35c have the respective orientations of liquid crystal droplets crossing the direction of electric field at 120 degrees, and the perpendicular component of the applied potential does not exceed the threshold level for changing the orientation of liquid crystal droplets.

A potential applied between the electrodes 37a and 37b also changes the orientation of liquid crystal droplets in the multilayer structure 35b, and a potential applied between the electrodes 38a and 38b causes the multilayer structure 35c to similarly behave. Thus, the three pairs of electrodes 36a/36b, 37a/37b and 38a/38b independently modify the optical properties of the three multilayer structures 35a, 35b and 35c, and a full-color image is produced on a screen of the color liquid crystal display unit.

Figure 16:
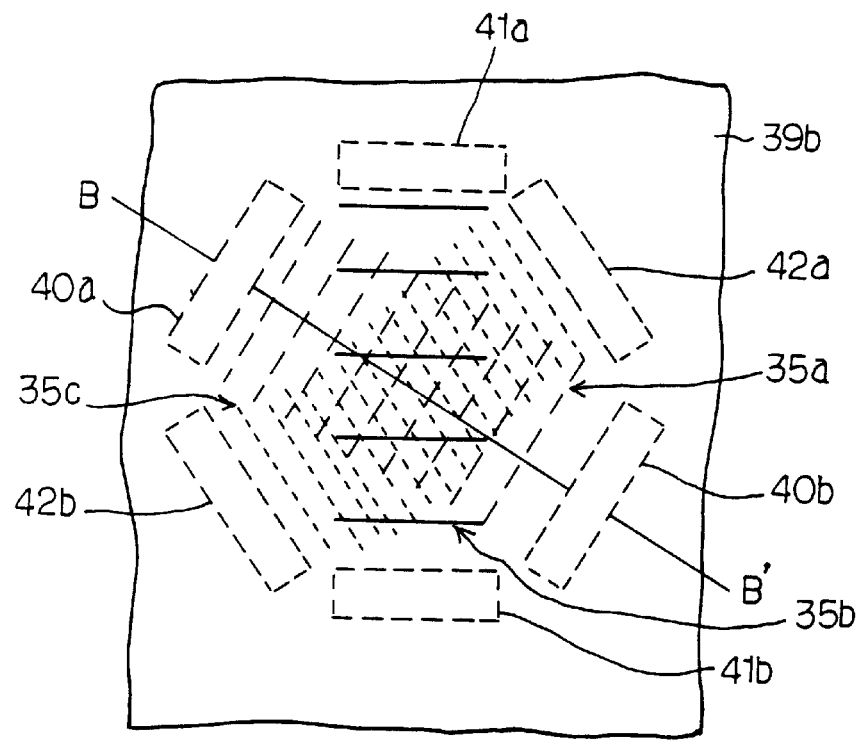
FIG. 16 is a plan view showing the layout of a modification of the color liquid crystal display unit.
Figure 17:
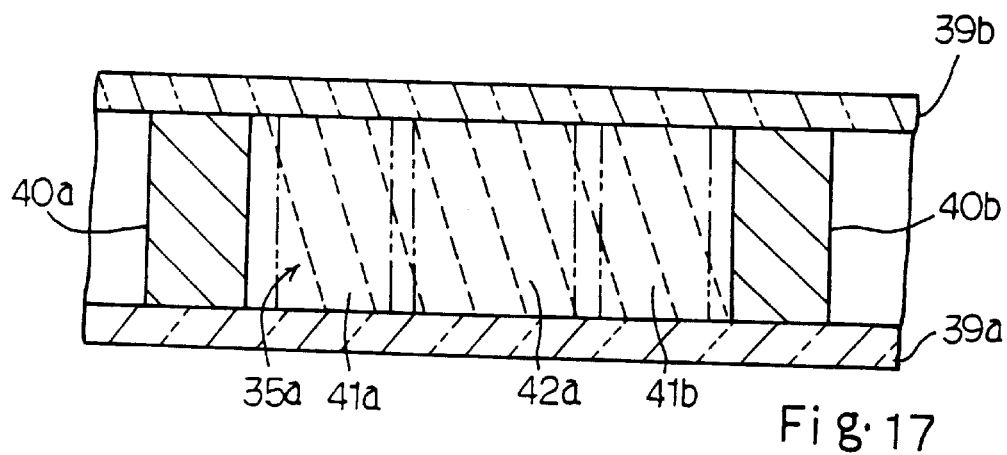
FIG. 17 is a cross sectional view taken along line B–B' of FIG. 16 and showing the structure of the color liquid crystal display unit.

Three pairs of electrodes 40a/40b, 41a/41b and 42a/42b may be angularly spaced apart from one another as shown in FIGS. 16 and 17. The electrodes 40a/40b, 41a/41b and 42a/42b may be supported by spacers (not shown) between the transparent substrates 39a and 39b or other suitable vertical walls.

EXAMPLES

Figure 18:
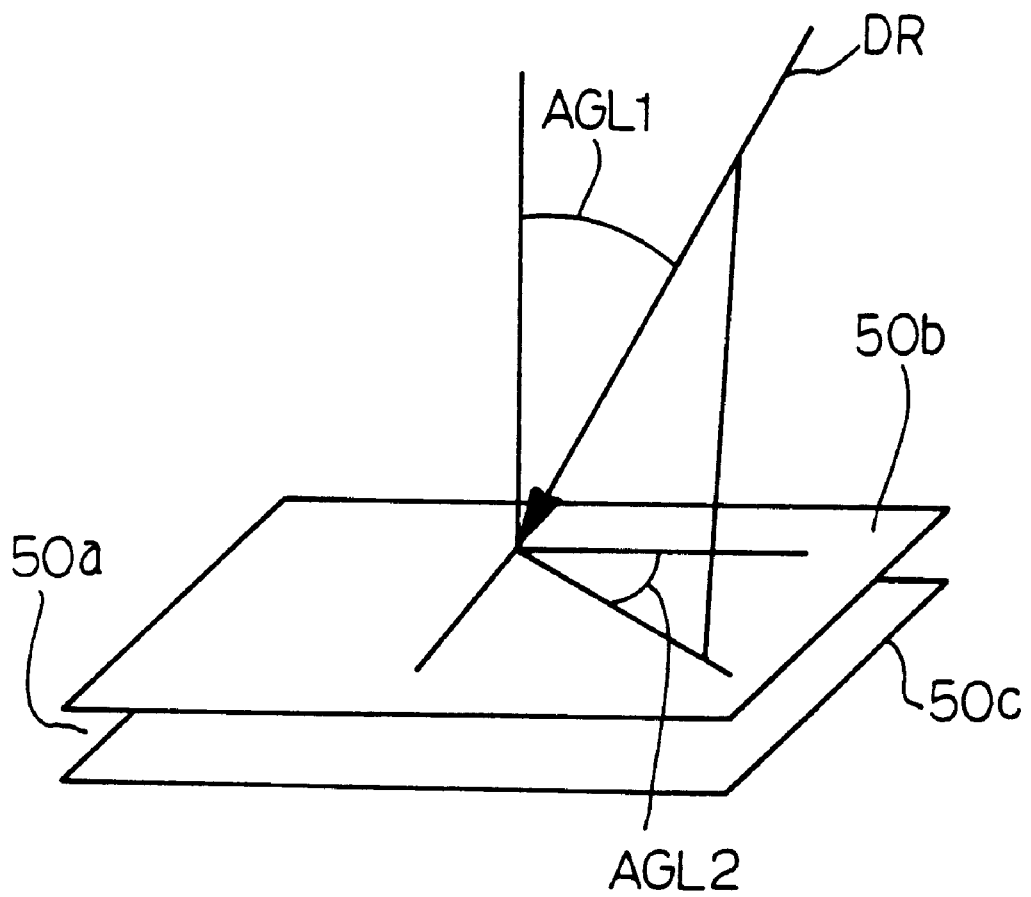
FIG. 18 is a view showing the definition of an incident direction.

The present inventors fabricated the holographic polymer dispersed liquid crystal structures and the liquid crystal display unit. In the following description, "incident direction DR" upon mixture 50a between transparent substrates 50b/50c is defined by an incident angle AGL1 and an incident azimuth AGL2 in consideration of the refraction in the transparent substrate 50b as shown in FIG. 18.

The first example was fabricated as follows. First, a pair of transparent glass substrates was prepared. The major surfaces of the glass substrates were coated with polyimide films, respectively. Spherical spacers were provided between the transparent glass substrates so as to space the transparent glass substrates from each other. The transparent glass substrates were jointed to each other, and the spherical spacers formed a space between the transparent glass substrates.

Subsequently, photo-curable polymer was mixed with nematic liquid crystal, and the mixture was injected into the space between the transparent glass substrates.

The transparent glass substrates filled with the mixture was placed in the laser beam radiating system (see FIGS. 5B and 5C). The reflecting mirrors 16d and 16e were regulated in such a manner that the incident angle AGL1 of the laser sub-beam LB12 was fixed to zero, and the other laser sub-beam LB11 was incident onto the mixture in the incident direction defined by the incident azimuth AGL2 of zero degree and a certain incident angle AGL1.

The laser beam generator 16a radiated the laser beam LB10, and the laser sub-beams LB11/LB12 produced the interference fringes in the mixture. The interference fringes photo-polymerized part of the photo-curable polymer in the mixture, and formed a first multilayer structure serving as the first phase grating. It was important for the laser beam radiation not to polymerize all the photo-curable polymer in the mixture, and the time period for the laser beam radiation was shorter than a time period for polymerizing all the photo-curable polymer.

Thereafter, the reflecting mirror 16c was changed in such a manner as to maintain the incident angle AGL1 and change the incident azimuth AGL2 by 180 degrees. The laser beam generator 16a radiated the laser beam LB10, and the laser sub-beams LB11/LB12 produced interference fringes in the mixture. The interference fringes polymerized the remaining photo-curable polymer, and formed a second multilayer structure serving as a second phase grating. The first multilayer structure and the second multilayer structure differently declined; however, the absolute angle with respect to the transparent glass substrates was equal between the first multilayer structure and the second multilayer structure. The first example was categorized in the first embodiment.

The second example was categorized in the third embodiment, and was fabricated as similar to the first example until the mixture was sealed into the space between the transparent glass substrates.

The transparent glass substrates filled with the mixture was also placed in the laser beam radiating system. The reflecting mirrors 16d and 16e were adjusted in such a manner that the laser sub-beam LB12 was incident onto the mixture in the normal direction as similar to the first example. The reflecting mirror 16c was regulated such that the incident azimuth AGL2 was zero at a certain incident angle. First, the laser beam generator 16a radiated the laser beam LB10 of the wavelength corresponding to the interference light component for red color, and a first phase grating was formed in the mixture. Thereafter, the incident azimuth AGL2 was changed from zero to 180 degrees, and the laser beam generator 16a radiated the laser beam LB10 for the interference light component for red color, again. Then, the second phase grating was formed in the mixture.

Subsequently, the reflecting mirror 16c was changed such that the incident azimuth AGL2 was 90 degrees, and the laser beam generator 16a was changed from the red color to green color. The laser beam generator 16a radiated the laser beam LB10 of the wavelength corresponding to the interference light component for the green color, and formed a third phase grating in the mixture. The incident azimuth AGL2 was changed from 90 degrees to 270 degrees, and the laser beam generator 16a radiated the laser beam for the green color so as to form a fourth phase grating.

In this way, the four phase gratings were fabricated in the holographic polymer dispersed liquid crystal structure for producing an image in red and green, and the holographic polymer dispersed liquid crystal structure was available for a reflective color liquid crystal display unit.

Figure 19:
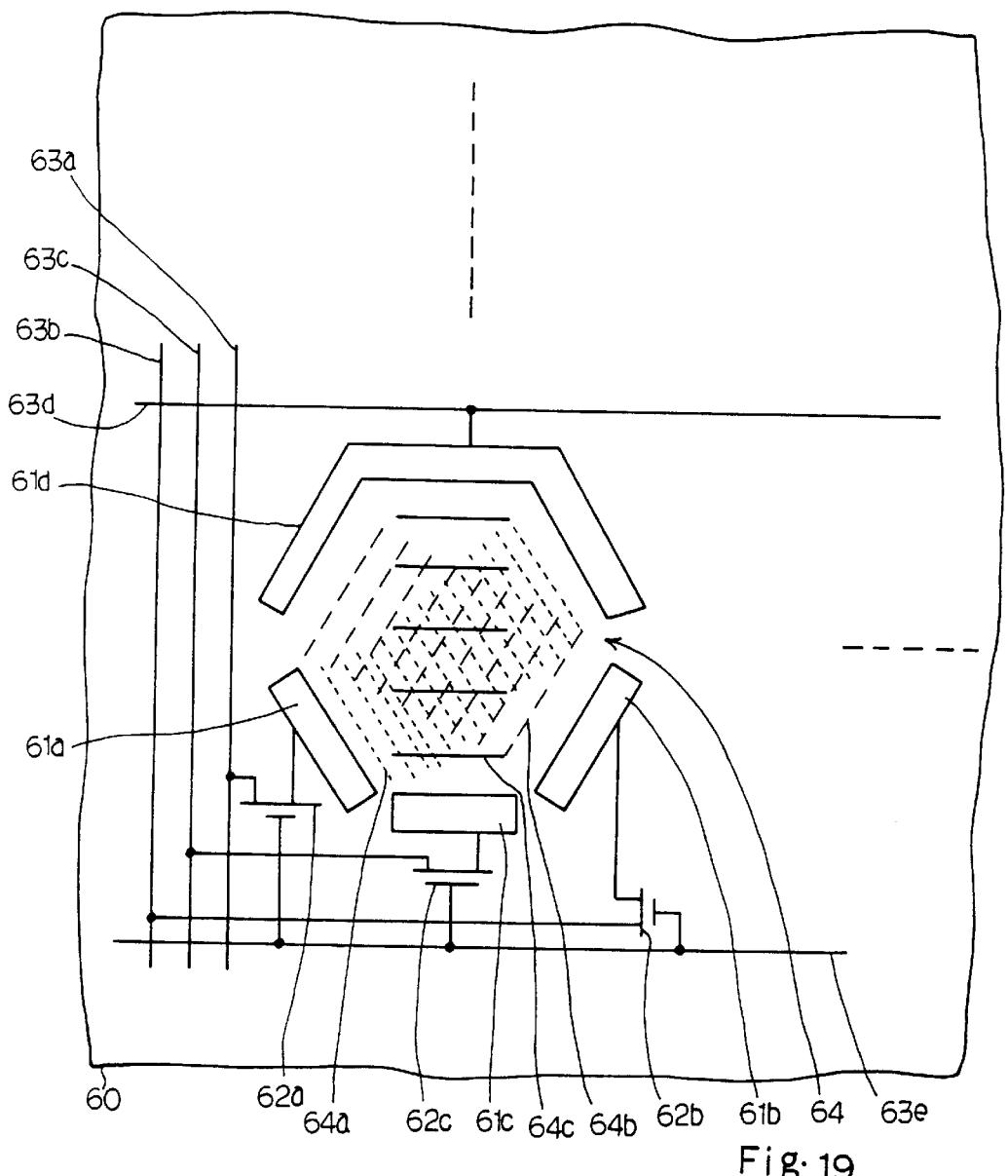
FIG. 19 is a schematic view showing an example of the liquid crystal display unit according to the present invention.

The third example was categorized in the third embodiment, and was illustrated in FIG. 19. Although FIG. 19 showed only one pixel on a screen incorporated in a color liquid crystal display unit, the screen contained a plurality of pixels, and a composite multilayer structure and associated electrodes were two-dimensionally repeated for forming the screen.

The present inventors prepared an amorphous silicon thin film transistor substrate 60. Three pixel electrodes 61a/61b/61c, a common electrode 61d, amorphous silicon thin film transistors 62a/62b/62c, signal lines 63a/63b/63c, a common potential line 63d and a scanning signal line 63e were formed on the amorphous silicon thin film transistor substrate 60. Spherical spacers (not shown) were inserted between the amorphous silicon thin film transistor substrate 60 and a counter substrate (not shown), and the amorphous silicon thin film transistor substrate 60 was jointed to the counter substrate. The spherical spacers formed a hollow space between the amorphous silicon thin film transistor substrate 60 and the counter substrate. The amorphous silicon thin film transistors 62a to 62c, the signal lines 63a to 63c, the scanning line 63e and the common potential line 63d formed parts of a controlling circuit.

Photo-curable polymer was mixed with nematic liquid crystal, and the mixture was injected into the space between the amorphous silicon thin film transistor substrate 60 and the counter substrate. The substrates filled with the mixture was placed in the laser beam radiating system shown in FIGS. 5B and 5C.

Using the direct polarization, the incident azimuth AGL2 was three times changed by 120 degrees, and, accordingly, the incident azimuth AGL2 was regulated to zero degree, 120 degrees and 240 degrees. The laser beam generator 16a radiated the laser beam LB10 of the wavelength corresponding to the interference light component for red color at zero degree, thereafter, the laser beam LB10 of the wavelength corresponding to the interference light component for green color at 120 degrees and, finally, the laser beam LB10 of the wavelength corresponding to the interference light component for blue color. Then, a composite multilayer structure 64 was formed in the image producing medium of holographic polymer dispersed liquid crystal, and the composite multilayer structure 64 consisted of three multilayer structures 64a, 64b and 64c for reflecting the primary three colors, respectively.

The present inventor confirmed the image production as follows. The signal lines 63a, 63b and 63c propagated a red color signal, a green color signal and a blue color signal, respectively. The scanning signal line 63d was changed to an active level, and the amorphous silicon thin film transistors' electrodes 61a, 61b and 61c concurrently turned on. Only the blue color signal was changed to the active level, and was applied through the amorphous silicon thin film transistor 62c to the electrode 61c. An electric field was created between the electrode 61c and the common electrode 61d, and changed the orientation of liquid crystal droplets of the multilayer structure 64c. The multilevel structure 64c reflected the blue light component, and formed an image in blue on the screen. Although the electric field affected the other multilayer structures 64a and 64b, the perpendicular components of the electric field were too small to change the orientations of liquid crystal droplets of the multilayer structures 64a and 64b, and the other multilayer structures 64a and 64b did not reflect the red light component and the green light component. When the blue color signal was changed to the red color signal or the green color signal, the image on the screen changed the color from blue to red or green.

As will be appreciated from the foregoing description, a plurality of multilayer structures are formed in the image producing medium according to the present invention, and produces a bright image. When the multilayer structures are regulated to specific wavelengths for different colors, only the single image producing medium selectively transmits or reflects the light components for the different colors, and the color liquid crystal display unit is portable and inexpensive.

The process according to the present invention forms a plurality of multilayer structures by changing the incident direction only, and is simpler than the prior art process.

Although particular embodiments of the present invention have been shown and described, it will be obvious to those skilled in the art that various changes and modifications may be made without departing from the spirit and scope of the present invention.

What is claimed is:

1. A liquid crystal structure formed between plate members, said liquid crystal structure comprising a plurality of phase gratings, each of said phase gratings spatially modifying a refractive index thereof, wherein at least one of said plurality of phase gratings is differently oriented from at least one other of said plurality of phase gratings with respect to said plate members, such that a reflecting surface of said at least one of said plurality of phase gratings is not parallel to a reflecting surface of said at least one other of said plurality of phase gratings, and reflected light components of said at least one of said plurality of phase gratings and of said at least one other of said plurality of phase gratings are reflected in a same direction.

2. The liquid crystal structure as set forth in claim 1, in which each of said plurality of phase gratings has a multilayer structure having liquid crystal droplet layers and polymer layers alternated with one another.

3. The liquid crystal structure as set forth in claim 2, in which said plurality of phase gratings reflects a plurality of predetermined light components, one of said predetermined light components for each of incident rays incident upon the plurality of phase gratings at different angles, and the plurality of predetermined light components of said incident rays are approximately equal in wavelength to one another so as to increase the intensity of said reflected light components.

4. The liquid crystal structure as set forth in claim 3, in which said rays are incident onto said plurality of phase gratings through one of said plate members, and said reflected light components pass through said one of said plate members toward the outside of said liquid crystal structure.

5. The liquid crystal structure as set forth in claim 3, in which said rays are incident onto said plurality of phase gratings through one of said plate members, and said reflected light components pass through the other of said plate members toward the outside of said liquid crystal structure.

6. The liquid crystal structure as set forth in claim 2, in which said plurality of phase gratings reflects a plurality of predetermined light components, one of said predetermined light components for each of incident rays incident upon the plurality of phase gratings, and the plurality of predetermined light components of said incident rays are different in wavelength to one another.

7. The liquid crystal structure as set forth in claim 2, in which liquid crystal droplets of each of said liquid crystal droplet layers are oriented in a certain direction.

8. A liquid crystal display for producing an image on a screen thereof, comprising:
  a first substrate and a second substrate spaced from one another for forming a space therebetween;
  an image producing medium filling said space, and having a plurality of phase gratings, at least one of said plurality of phase gratings being differently oriented from at least one other of said plurality of phase gratings with respect to said first and second substrates such that a reflecting surface of said at least one of said plurality of phase gratings is not parallel to a reflecting surface of said at least one other of said plurality of phase gratings, said image producing medium being responsive to an electric field for changing reflecting directions of rays respectively incident onto said plurality of phase gratings;
  a light source for illuminating said image producing medium;
  a plurality of electrodes formed in said space for selectively creating said electric field; and
  a controlling circuit connected to said plurality of electrodes, and selectively supplying an electric potential between at least two of said plurality of electrodes for creating said electric field across said image producing medium, thereby causing said plurality of phase gratings,
    including said at least one and said at least one other of said plurality of phase gratings, to selectively reflect incident rays to outside of said liquid crystal display as output rays oriented in the same direction for forming said image.

9. The liquid crystal display as set forth in claim 8, in which each of said plurality of phase gratings includes a plurality of polymer layers and a plurality of liquid crystal droplet layers alternated with one another.

10. The liquid crystal structure as set forth in claim 9, in which said plurality of phase gratings reflects light components of said incident rays incident at different angles and approximately equal in wavelength to one another.

11. The liquid crystal structure as set forth in claim 9, in which said plurality of phase gratings reflects light components of said incident rays different in wavelength from one another.

12. The liquid crystal display as set forth in claim 11, in which said light components are corresponding to the primary three colors.

13. The liquid crystal display as set forth in claim 12, in which three electrodes of said plurality of electrodes serve as pixel electrodes for a pixel on a screen, and are associated with said plurality of phase gratings for applying electric sub-fields of said electric field independently to said plurality of phase gratings under the control of said controlling circuit.

14. A process of fabricating a liquid crystal structure, comprising the steps of:
  a) preparing a mixture of photo-curable polymer and a liquid crystal sealed between a first substrate and a second substrate;
  b) radiating a first laser beam through a first substrate to said mixture and a second laser beam through a second substrate to said mixture so as to produce first interference fringes in said mixture, thereby forming a first phase grating in said mixture;
  c) changing an incident direction of at least one of said first laser beam and said second laser beam so as to produce second interference fringes different in orientation with respect to said first and second substrates from said first interference fringes, thereby forming a second phase grating in said mixture, such that said orientation of said second interference fringes causes output light rays of said fist and second phase gratings to be output in a same direction; and
  d) repeating said step c), when more than two phase gratings are needed in said liquid crystal structure.

15. The process as set forth in claim 14, in which said first and second laser beams in said step b) are equal in wavelength to said first and second laser beams in said step c).

16. The process as set forth in claim 14, in which said first and second laser beams in said step b) are different in wavelength to said first and second laser beams in said step c).

17. The process as set forth in claim 14, said first and second laser beams in said step b), said first and second laser beams in said step c) and the first and second laser beams in said step d) are regulated in such a manner that said first phase grating, said second phase grating and the phase grating formed in said step d) respectively reflect light components for the three primary colors.

18. The process as set forth in claim 14, in which an electric field is created across said mixture in each of said step b), said step c) and said step d).

* * * * *